United States Patent
Peebles et al.

(10) Patent No.: US 10,840,552 B2
(45) Date of Patent: Nov. 17, 2020

(54) ADDITIVES FOR HIGH VOLTAGE LITHIUM ION BATTERIES

(71) Applicant: UCHICAGO ARGONNE, LLC, Chicago, IL (US)

(72) Inventors: Cameron Peebles, Oak Park, IL (US); Ilya A. Shkrob, Chicago, IL (US); Chen Liao, Westmont, IL (US); Daniel Abraham, Bolingbrook, IL (US); Hakim Iddir, Hoffman Estates, IL (US); Juan Garcia, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 210 days.

(21) Appl. No.: 15/916,723

(22) Filed: Mar. 9, 2018

(65) Prior Publication Data
US 2019/0207256 A1   Jul. 4, 2019

Related U.S. Application Data

(60) Provisional application No. 62/611,792, filed on Dec. 29, 2017.

(51) Int. Cl.
*H01M 10/00* (2006.01)
*H01M 10/0567* (2010.01)
(Continued)

(52) U.S. Cl.
CPC ..... *H01M 10/0567* (2013.01); *H01M 10/058* (2013.01); *H01M 10/0525* (2013.01);
(Continued)

(58) Field of Classification Search
CPC ......... H01M 10/0567; H01M 10/0568; H01M 10/0569; H01M 10/058; H01M 10/0525; H01M 2300/0037; H01M 2220/20
See application file for complete search history.

(56) References Cited

U.S. PATENT DOCUMENTS

| | | |
|---|---|---|
| 8,308,971 B1 | 11/2012 | Bhat et al. |
| 9,312,073 B2 | 4/2016 | Kaneko et al. |
| 2016/0240888 A1 | 8/2016 | Hamasaki et al. |

FOREIGN PATENT DOCUMENTS

KR    20150022264 A  *  3/2015

OTHER PUBLICATIONS

Machine translation of KR-20150022264-A, obtained Dec. 20, 2019 (Year: 2015).*

(Continued)

*Primary Examiner* — Nicholas P D'Aniello
(74) *Attorney, Agent, or Firm* — Olson & Cepuritis, Ltd.

(57) ABSTRACT

This invention relates to a method for preparing an electrochemical cell comprising the sequential steps of preparing a solution of a lithium salt in an non-aqueous solvent containing an additive compound, and maintaining the solution at a temperature in the range of about 20 to about 30° C. for about 5 to 10 days to form an aged electrolyte; assembling an electrochemical cell from an anode, a cathode, and the aged electrolyte; and electrochemically subjecting the electrochemical cell to formation cycling. The additive compound comprises one or more compounds selected from the group consisting of: $(R_3SiO)_3B$, $(R_3SiO)_3XY$, $(R_3SiO)_3P$, $(R'O)_3PO$, $(R_3Si)_3X'$, $R_3SiOS(O)_2R'$; $(R_3Si)OC(=O)R'$; wherein each R and R' independently is a hydrocarbyl group; X is P or B; Y is O or S; X is Ti or Al. Electrochemical cells and batteries also are described.

14 Claims, 3 Drawing Sheets

(51) Int. Cl.
   H01M 10/0525    (2010.01)
   H01M 10/058     (2010.01)
   H01M 10/0569    (2010.01)
   H01M 10/0568    (2010.01)
(52) U.S. Cl.
   CPC ... *H01M 10/0568* (2013.01); *H01M 10/0569* (2013.01); *H01M 2220/20* (2013.01); *H01M 2300/0037* (2013.01)

(56) References Cited

OTHER PUBLICATIONS

Bak, S-M., Structural Changes and Thermal Stability of Charged LiNixMnyCozO2 Cathode Materials Studied by Combined In Situ Time-Resolved XRD and Mass Spectroscopy, ACS Appl. Mater. Interfaces 6, 22594-22601 (2014).

Cavell, R.G. et al., Trimethylsilyl Esters of Phosphorus Acids. III. Esters of Difluoro- and Bis(trifluoromethyl) phosphinous and -thiophosphinous Acids, Inorganic Chemistry 12 (6), 1374-1380 (1973).

Cavell, R.G. et al., Trimethylsilyl Esters of Phosphorus Acids. II. Reactions of Fluoro- and Trifluoromethylphosphorus (V) Oxides and Sulfides with Hexamethyldisiloxane and Hexamethyldisilthiane and the Synthesis of a Novel Phosphorane, Inorganic Chemistry 11 (11), 2578-2583 (1972).

Cavell, R.G. et al., Trimethylsilyl Esters of Phosphorus Acids. I. Preparation and Properties of Esters of Difluoro- and Bis(trifluoromethyl)phosphinic, -thiophosphinic, and -dithiophosphinic Acids 11 (11), 2573-2578 (1972).

Gilbert, J.A. et al., Transition Metal Dissolution, Ion Migration, Electrocatalytic Reduction and Capacity Loss in Lithium-Ion Full Cells, Journal of the Electrochemical Society 164 (2), A389-A399 (2017).

Gilbert, J.A. et al., Cycling Behavior of NCM523/Graphite Lithium-Ion Cells in the 3-4,4 V Range: Diagnostic Studies of Full Cells and Harvested Electrodes, Journal of the Electrochemical Society 164 (1), A6054-A6065 (2017).

Long, B.R. et al., Enabling High-Energy, High-Voltage Lithium-Ion Cells: Standardization of Coin-Cell Assembly, Electrochemical Testing, and Evaluation of Full Cells, Journal of The Electrochemical Society 163 (14), A2999-A3009 (2016).

Ma, L. et al., Improving the High Voltage Cycling of Li[Ni0.42Mn0.42Co0.16]O2 (NMC442)/Graphite Pouch Cells Using Electrolyte Additives, Journal of the Electrochemical Society 161 (14), A2250-A2254 (2014).

Rovnanik, P. et al., Synthesis and Characterisation of Trimethylsilyl Phosphorohalidates: Me3SiOP(O)FX (X=Cl, Br) and (Me3SiO)2P2O3F2, Journal of Fluorine Chemistry 125, 83-90 (2004).

Song, Y-M. et al., A Multifunctional Phosphite-Containing Electrolyte for 5V-Class LiNi0.5Mn1.5O4 Cathodes With Superior Electrochemical Performance, Journal of Materials Chemistry A, J. Mater. Chem. A, 2, 9506-9513 (2014).

Qi, X. et al., Lifetime Limit of Tris(trimethylsilyl) Phosphite as Electrolyte Additive for High Voltage Lithium Ion Batteries, RSC Adv. 6, 38342-38349 (2016).

* cited by examiner

ADDITIVES FOR HIGH VOLTAGE LITHIUM ION BATTERIES

CROSS-REFERENCE TO RELATED APPLICATIONS

This application claims priority benefit of U.S. Provisional Application Ser. No. 62/611,792, filed on Dec. 29, 2017, which is incorporated herein by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrolyte materials for lithium electrochemical cells and batteries. More particularly, this invention relates to electrolytes comprising electrolyte additives, as well as electrochemical cells, and batteries comprising the electrolytes.

BACKGROUND

The use of high-voltage, high-capacity positive electrodes in lithium-ion batteries is complicated by their tendency to degrade organic electrolytes. Electrolyte additives modifying the cathode surface are needed to delay this damage. Tris(trimethylsilyl) phosphite (TMSPi) is one such electrolyte additive, but the mechanism for its protective action (similar to other phosphite, borate, and boroxane compounds) remains incompletely understood. In $LiPF_6$ containing electrolytes, TMSPi undergoes extensive solvolysis, yielding numerous reaction products.

Electrification of vehicles demands significant increases in the energy density of storage devices. Currently, the maximum capacity of Li-ion batteries (LIBs) is limited by cathode materials, and high energy density (>700 Wh/L) cathodes are urgently needed. This requires a combination of high capacity (>200 mAh/g) and high voltage (>4 V vs Li/Li+) materials. While such materials are known, their use remains problematic, as such high-voltage cathodes degrade organic electrolytes in contact with the energized cathode during cell cycling. For this reason, stabilization of cathode surface by protective agents that stall the electrolyte decomposition is generally required. Phosphites ($P(OR)_3$), phosphates ($OP(OR)_3$), borates ($B(OR)_3$) and boroxane ($c-B_3O_3(OR)_3$) derivatives are among these cathode protective agents, but the mechanism of their beneficial action is not fully understood.

The intended function of the electrolyte additive is two-fold. Most importantly, it needs to impede Li+ ion capacity loss (also known as "capacity fade") due to formation of solid deposits on the electrodes that are known as solid-electrolyte interphases (SEIs) that trap Li+ ions and/or reduce their mobility. In LIBs, this capacity fade occurs mainly in the negative (e.g., graphite) electrode, but deleterious reactions on and in the cathode (such as hydrogen fluoride (HF) corrosion and transition metal (TM) ion loss) can also have considerable effect on SEI performance. Equally important is reducing the impedance rise that occurs due to slowing down of Li+ ion migration across the interphases and/or irreversible changes in the cathode materials. The increased cell impedance prevents rapid charging and discharging of the cell, reducing both power consumption and power delivery when, e.g., the electric vehicle is driven (during acceleration and regenerative breaking, respectively) and by lengthening the time needed to charge a vehicle. Unlike the capacity fade that involves the cathode material indirectly, this impedance rise mainly originates in the cathode due to reactions in or near the cathode, including the electrolyte oxidation. The ideal electrolyte additive should decrease both the capacity fade and the impedance rise. Unfortunately, this is rarely the case, so more than one electrolyte additive is often used in the industry.

Part of the expected action of these additives is HF scavenging in the electrolyte bulk (such compounds are sometimes referred to as HF "getters"). For example, acidolysis of O—R bonds in phosphite and borate additives by HF yields inactive fluoro compounds, removing the corrosive hydrofluoric acid. The latter originates through hydrolysis of $LiPF_6$ that is used as salt in the electrolyte. Residual moisture and/or surface hydroxyl groups can react with $PF_6^-$-anions in solution, yielding HF and releasing $PF_5$ that subsequently hydrolyses to $OPF_3$, $PO_2F_2^-$ and $PO_3F_2^-$ (note that these anions can form esters with the solvent, yielding numerous daughter products). In each step of this sequence, one or two additional HF molecules are generated. The released HF corrodes the cathode and, in some cases, the anode, causing gradual deterioration of electrochemical performance. While there are anions that are stable both to hydrolysis and anodic oxidation, their stability poses a problem. Such hardy anions facilitate anodic dissolution of Al current collectors in the cathode, while HF generated near the surface passivates the Al surface. Consequently, there is an ongoing need to retain $LiPF_6$ as the electrolyte salt but minimize corrosion of the active material due to HF release. Using HF "getters" is envisioned to be a way of achieving this goal. Since the Si—O bond in the trimethylsiloxyl (—$OSiMe_3$) group is especially easy to cleave by HF, many of the currently used cathode protective additives include this group. However, the strategy of using such HF "getters" has a major flaw, as any reaction that consumes HF also facilitates further hydrolysis of $PF_6^-$ by shifting the hydrolytic equilibria. This consideration sheds doubt on the theory that the best performing electrolyte additives work exclusively or even primarily as HF scavengers.

Indeed, had this HF scavenging been the only role of the electrolyte additive, many molecular designs for such compounds would be possible; however, empirically it has been shown that the HF scavenging ability does not strongly correlate with the efficacy of an additive in retarding deterioration of electrochemical performance. In the view of such discrepancies, it has been suggested that the additives serve as sacrificial agents, either by forming thin protective layers on the cathodes or, possibly, by modifying surface centers that catalyze oxidation/degradation of the electrolyte. Importantly, such cathode modifying agents may not be the additives themselves, but rather the products of their chemical transformation in the electrolyte or on the cathode surface.

The methods, electrolytes, additives electrochemical cells, and batteries described herein address the ongoing need for improved electrolytes in LIBs.

SUMMARY OF THE INVENTION

A method for preparing lithium ion electrochemical cell is described herein. The method comprises the sequential steps of (a) preparing a solution of a lithium salt in a non-aqueous solvent containing an additive compound, and aging the solution by maintaining the solution at a temperature in the range of about 20 to about 30° C. for about 5 to 10 days to form an aged electrolyte; (b) assembling an electrochemical cell from an anode, a cathode, and the aged electrolyte; and (c) then electrochemically subjecting the electrochemical cell to formation cycling (e.g., to form a solid electrolyte interface (SEI) on the anode thereof). The additive compound comprises one or more compounds selected from the group consisting of: $(R_3SiO)_3B$, $(R_3SiO)_3XY$, $(R_3SiO)_3P$, $(R'O)_3PO$, $(R_3Si)_3X'$, $R_3SiOS(O)_2R'$; $(R_3Si)OC(=O)R$; wherein each R and R' independently is a hydrocarbyl group; X is P or B; Y is O or S; X' is Ti or Al. A preferred additive compound is $(R_3SiO)_3P$ (e.g., trimethylphosphite; $Me_3SiO)_3P$). Preferably, the additive compound is present in the composition at a concentration in the range of about 0.0005 molar (M) to about 0.2 M.

The methods described herein provide unexpected benefits including preventing excessive impedance increases upon repeated cycling without significantly affecting capacity retention, improvements in coulombic efficiency, and providing an improved protective film on positive electrode oxide surfaces. In conventional battery manufacture, $(Me_3SiO)_3P$ has been used as an additive in $LiPF_6$-based electrolytes, however, the electrolyte composition typically is charged into the cell shortly after being combined with the $(Me_3SiO)_3P$, or may be stored for a significant, uncontrolled period after adding the $(Me_3SiO)_3P$. In contrast, the methods described herein mandate a specific aging period (e.g., at a temperature in the range of about 20 to about 30° C. for about 5 to 10 days) prior to cell assembly and formation cycling. Aging for shorter or longer periods results in degraded performance relative to the aging process described herein. Consequently, the methods described herein provide unexpectedly improved impedance, coulombic efficiency, and beneficial cathode surface protection not observed with $(Me_3SiO)_3P$ when used conventionally. These improvements are believed to be due to formation of $R_3SiOP(O)_nF_2$ (wherein each R group independently is a hydrocarbyl group (e.g., a $C_1$ to $C_{12}$ hydrocarbyl group such as an alkyl, aryl, aryl-substituted alkyl, alkyl-substituted aryl, and the like); and n is 0 or 1) by degradation of $(Me_3SiO)_3P$ during the aging process. The $R_3SiOP(O)_nF_2$ takes time to build up in the electrolyte solution and then degrades after a certain period of time, which accounts for the need for a controlled aging period. The identity of these fluorinated phosphorus materials as highly active electrolyte additives has not been reported previously.

In some embodiments, each R and R' independently is a hydrocarbyl moiety selected from the group consisting of alkyl, aryl, aryl-substituted alkyl and alkyl-substituted aryl. A preferred additive compound comprises a compound of formula $(R_3SiO)_3P$, wherein each R independently is a hydrocarbyl group (e.g., each R independently is a hydrocarbyl moiety selected from the group consisting of alkyl, aryl, aryl-substituted alkyl and alkyl-substituted aryl, such as methyl, ethyl, n-propyl, isopropyl, n-butyl, sec-butyl, t-butyl, and phenyl). Preferably, each R is methyl.

In embodiments in which $(R_3SiO)_3P$ is the additive compound, step (a) preferably produces a compound of formula $R_3SiOP(O)_nF_2$ from the additive compound; wherein each R independently is a hydrocarbyl group; and n is 0 or 1 (e.g., each R independently can be a hydrocarbyl moiety selected from the group consisting of alkyl, aryl, aryl-substituted alkyl and alkyl-substituted aryl, such as methyl, ethyl, n-propyl, isopropyl, n-butyl, sec-butyl, t-butyl, and phenyl; preferably methyl).

The lithium salt of the electrolyte preferably comprises at least one salt selected from the group consisting of lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate ($LiClO_4$), lithium bis(oxalato)borate (LiBOB), lithium difluoro(oxalato)borate (LiDFOB), lithium tetrafluoroborate ($LiBF_4$), lithium hexafluorophosphate ($LiPF_6$), lithium thiocyanate (LiSCN), lithium bis(fluorosulfonyl)imidate (LiFSI), lithium bis(pentafluoroethylsulfonyl)imidate (LBETI), lithium tetracyanoborate ($LiB(CN)_4$), and lithium nitrate. $LiPF_6$ is a particularly preferred salt. The lithium salt preferably is present in the composition at a concentration in the range of about 0.1 M to about 3 M.

The non-aqueous solvent can be any non-aqueous suitable for use in lithium ion batteries. Non-limiting examples of such solvents include an ether, a carbonate ester, a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. The solvent can be a single solvent or a mixture of two or more solvents. In some embodiments, the non-aqueous solvent comprises a combination of an alkylene carbonate and a dialkyl carbonate, e.g., a mixture of ethylene carbonate (EC) and ethyl methyl carbonate (EMC). One preferred solvent mixture is a combination of ethylene carbonate and ethyl methyl carbonate in a respective weight ratio of about 3:7.

An electrochemical cell comprises an anode, a cathode, and a lithium-containing electrolyte contacting the anode and the cathode in which the electrochemical cell is produced by the method described herein, e.g., in which the electrolyte is aged prior to formation cycling. A preferred embodiment comprises a plurality of electrochemical cells of described herein, electrically connected in series, in parallel, or in both series and parallel.

In another aspect an electrolyte composition comprises a lithium salt in a non-aqueous solvent containing an additive comprising a compound of formula $R_3SiOP(O)_nF_2$; wherein each R independently is a hydrocarbyl group; and n is 0 or 1; wherein the additive is substantially free from $(R_3SiO)_3P(O)_n$ and $(R_3SiO)_2P(O)_nF$ (e.g., prior to combining the additive with the solvent and lithium salt), as well as electrochemical cells and batteries comprising the electrolyte. In another aspect, this invention relates to an electrochemical cell comprising an anode, a cathode, and a lithium-containing electrolyte contacting the anode and the cathode, wherein the electrolyte is produced by preparing a solution of a lithium salt in an non-aqueous solvent containing an additive compound, and aging the solution prior to contacting the anode and cathode with the electrolyte.

The methods described herein provide unexpected benefits including preventing excessive impedance increases upon repeated cycling without significantly affecting capacity retention, improvements in coulombic efficiency, and providing an improved protective film on positive electrode oxide surfaces.

DETAILED DESCRIPTION

The use of lithium ion batteries (LIBs) for transportation applications continues to grow as the cost of battery cells continues to decrease. However, for LIBs to be a viable option for long-range travel, and be competitive with internal-combustion engines, they must have high energy densities. To meet this challenge high energy cathode materials including nickel-rich layered oxides, such as $LiNi_xMn_yCo_2O_2$ (where x+y+z=1) (NMC), are currently being investigated. These oxides exhibit high capacities (>200 mAh/$g_{oxide}$) but require high voltages (4.5 V vs. Li/Li$^+$) to attain these capacities. (1) At these high voltages electrolyte oxidation (decomposition) at the positive (NMC532) electrode can lead to several detrimental effects during cell cycling, including transition metal dissolution and high impedance phases at the oxide surface. In order to make the electrolyte system stable during high voltage operation, additives are commonly used. These additives are used in small quantities (<5 wt %) and typically serve as sacrificial materials which decompose prior to the electrolyte and form a passivating (or protective) layer on the electrode surface. Common additives include vinylene carbonate (VC) and lithium bis(oxalate)borate (LiBOB). One additive in particular, tris(trimethylsilyl) phosphite (TMSPi), has gained attention for high voltage lithium-ion battery applications. The beneficial effects of TMSPi have been attributed to its ability to scavenge HF from the electrolyte and form a protective film on the positive electrode.

A method for preparing lithium ion electrochemical cell comprises several steps that when performed in the specified order result in an improved lithium cell in which excessive impedance increases are prevented upon repeated cycling, without significantly affecting capacity retention, and which provide improvements in coulombic efficiency, and an improved protective film on positive electrode oxide surfaces. The sequential steps comprise (a) preparing a solution of a lithium salt in a non-aqueous solvent containing an additive compound, and aging the solution by maintaining the solution at a temperature in the range of about 20 to about 30° C. for about 5 to 10 days to form an aged electrolyte; (b) assembling an electrochemical cell from an anode, a cathode, and the aged electrolyte; and (c) then electrochemically subjecting the electrochemical cell to formation cycling (e.g., to form a solid electrolyte interface (SEI) on the anode thereof). The additive compound comprises one or more compounds selected from the group consisting of: $(R_3SiO)_3B$, $(R_3SiO)_3XY$, $(R_3SiO)_3P$, $(R'O)_3PO$, $(R_3Si)_3X'$, $R_3SiOS(O)_2R'$; $(R_3Si)OC(=O)R$; wherein each R and R' independently is a hydrocarbyl group; X is P or B; Y is O or S; X' is Ti or Al. A preferred additive compound is $(R_3SiO)_3P$, e.g., trimethylphosphite, $(Me_3SiO)_3P$.

As used herein, the term "hydrocarbyl" and grammatical variations thereof refers to univalent groups formed by removing a hydrogen atom from a hydrocarbon, e.g. ethyl, phenyl, phenylmethyl, methylphenyl, ethynylphenyl, allyl, propargyl, or any other monovalent hydrocarbon group, and the like. Hydrocarbyl groups can be saturated (contain no multiple bonds), unsaturated (containing at least one double or triple bond), or aromatic (containing an aromatic ring system such as a benzene ring, or a condensed aromatic ring system such as a naphthalene, anthracene, and similar systems). Hydrocarbyl groups can include linear chains of carbons atoms (linear alkyl), branched chains of carbon atoms (e.g., branched alkyl), rings of carbon atoms (e.g., cycloalkyl), or any combination thereof. Non-limiting examples of hydrocarbyl groups include alkyl, alkenyl, alkynyl, aromatic (aryl) groups, aromatic groups substituted by an alkyl alkenyl, or alkynyl group), cycloalkyl, cycloalkenyl, terpenyl, and the like. In some embodiments, each hydrocarbyl group independently comprises 1 to 12 carbon atoms.

Non-limiting examples of lithium salts useful in the electrolyte compositions and methods described herein include, e.g., lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate ($LiClO_4$), lithium bis(oxalato)borate (LiBOB), lithium difluoro(oxalato)borate (LiDFOB), lithium tetrafluoroborate ($LiBF_4$), lithium hexafluorophosphate ($LiPF_6$), lithium thiocyanate (LiSCN), lithium bis(fluorosulfonyl)imidate (LiFSI), lithium bis(pentafluoroethylsulfonyl)imidate (LiBETI), lithium tetracyanoborate ($LiB(CN)_4$), lithium nitrate, combinations of two or more thereof, and the like. In some preferred embodiments, the lithium salt comprises lithium nitrate in combination with at least one other salt, e.g., LiTFSI. Preferably, the lithium salt is selected from one or more of $LiF_2BC_2O_4$, $LiPF_6$, $LiBF_4$, $LiB(C_2O_4)_2$, $LiClO_4$, lithium bis(fluorosulfonyl)imidate (LiFSI), lithium bis(trifluoromethanesulfonyl)imidate (LiTFSi), and $LiAsF_6$. The lithium salt can be present in the electrolyte at any concentration suitable for lithium-ion battery applications, which concentrations are well known in the secondary battery art. In some embodiments, the lithium salt is present in the electrolyte at a concentration in the range of about 0.1 M to about 3 M, e.g., about 0.5 M to 2 M, or 1 M to 1.5M. A particularly preferred lithium salt is $LiPF_6$.

The electrolytes described herein comprise a non-aqueous solvent, wherein the solvent comprises one or more solvent compounds selected from an ether, a carbonate ester, a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether (e.g., glyme or diglyme), a linear dialkyl carbonate (e.g., dimethyl carbonate (DMC), diethyl carbonate (DEC), ethyl methyl carbonate (EMC) and the like), a cyclic alkylene carbonate (ethylene carbonate (EC), propylene carbonate (PC) and the like), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate, a fluoro-substituted sulfolane, and a fluoro-substituted sulfone. The solvent can comprise a single solvent compound or a mixture of two or more solvent compounds. In some embodiments, the solvent comprises a mixture of a cyclic alkylene carbonate and a linear dialkyl carbonate, for example, a mixture of ethylene carbonate and ethyl methyl carbonate (EC/EMC).

A preferred solvent for the electrolytes described herein comprises ethylene carbonate and ethyl methyl carbonate in respective weight ratio of approximately 3:7. Preferably, the concentration of lithium salt in the non-aqueous solvent of this embodiment is in the range of about 0.1 molar (M) to about 5 M, more preferably about 1 M to about 1.5 M (e.g., about 1.2 M), for example, 1.2 M LiPF$_6$ in ethylene carbonate/ethyl methyl carbonate (3:7 weight ratio), sometimes referred to as Gen 2 electrolyte.

The additives described herein can be present in the electrolyte at any concentration, but in some embodiments are present at a concentration in the range of about 0.0005 M to about 0.25 M. In some embodiments, the additive is present in the electrolyte at a concentration in the range of about 0.006 M to about 0.13 M, or about 0.03 M to about 0.1 M. Alternatively, the additive can be present in the electrolyte at a concentration in the range of about 0.01 to about 4 percent by weight (wt %), e.g., about 0.1 to about 2 wt %, or about 0.5 to about 1.5 wt %.

The electrolytes can be incorporated in a lithium ion electrochemical cell comprising a positive electrode (cathode), a negative electrode (anode), and a porous separator between the cathode and anode, with the electrolyte in contact with both the anode and cathode, as is well known in the battery art. A battery can be formed by electrically connecting two or more such electrochemical cells in series, parallel, or a combination of series and parallel. The electrolyte can be utilized with any anode or cathode compositions useful in lithium-ion batteries. Electrochemical cell and battery designs and configurations, anode and cathode materials, as well as electrolyte salts, solvents and other battery or electrode components (e.g., separator membranes, current collectors), which can be used in the electrolytes, cells and batteries described herein, are well known in the lithium battery art, e.g., as described in "Lithium Batteries Science and Technology" Gholam-Abbas Nazri and Gianfranco Pistoia, Eds., Springer Science+Business Media, LLC; New York, N.Y. (2009), which is incorporated herein by reference in its entirety.

Cell Assembly.

Processes used for manufacturing lithium cells and batteries are well known in the art. The active electrode materials are coated on both sides of metal foil current collectors (typically copper for the anode and aluminum for the cathode) with suitable binders such as polyvinylidene difluoride and the like to aid in adhering the active materials to the current collectors. The anode active material typically is a carbon material such as graphite, and the cathode active material typically is a lithium metal oxide material. Cell assembly typically is carried out on automated equipment. The first stage in the assembly process is to sandwich a separator between the anode. The cells can be constructed in a stacked structure for use in prismatic cells, or a spiral wound structure for use in cylindrical cells. The electrodes are connected to terminals and the resulting sub-assembly is inserted into a casing, which is then sealed, leaving an opening for filling the electrolyte into the cell. Next, the cell is filled with the electrolyte and sealed under moisture-free conditions.

Formation.

Once the cell assembly is completed the cell must be subjected to at least one controlled charge/discharge cycle to activate the electrode materials and form a solid electrolyte interface (SEI) layer on the anode. This is known as formation cycling. The formation cycling process is well known in the battery art and involves initially charging with a low voltage (e.g., substantially lower that the full-cell voltage) and gradually building up the voltage. The SEI acts as a passivating layer which is essential for moderating the charging process under normal use. The formation cycling can be carried out, for example, according to the procedure described in Long et al. *J. Electrochem. Soc.,* 2016; 163 (14): A2999-A3009, which is incorporated herein by reference in its entirety. This procedure involves a 1.5 V tap charge for 15 minutes at C/3 current limit, followed by a 6 hour rest period, and then 4 cycles at C/10 current limit, with a current cutoff (i≤0.05 C) at the top of each charge.

In one aspect, a lithium ion electrochemical cell or battery comprises an electrolyte that is formed by preparing a solution of a lithium salt in an non-aqueous solvent containing an additive compound, and aging the solution (e.g., at a temperature in the range of about 20 to about 30° C. for about 5 to 10 days) prior to contacting the anode and cathode with the electrolyte; and then formation cycling the cell; and wherein the additive compound comprises one or more compounds selected from the group consisting of: $(R_3SiO)_3$X, $(R_3SiO)_3$XY, $(R_3SiO)_3$P, $(R'O)_3$PO, $(R_3Si)_3$X', $R_3$SiOS(O)$_2$R'; $(R_3Si)OC(\!=\!\!O)R'$; wherein each R and R' independently is a hydrocarbyl group.

The methods described herein provide unexpected benefits including preventing excessive impedance increases upon repeated cycling without significantly affecting capacity retention, improvements in coulombic efficiency, and providing an improved protective film on positive electrode oxide surfaces. In conventional battery manufacture, $(Me_3SiO)_3P$ has been used as an additive in LiPF6-based electrolytes, however, the electrolyte composition typically is charged into the cell shortly after being combined with the $(Me_3SiO)_3P$, or may be stored for a significant, uncontrolled period after adding the $(Me_3SiO)_3P$. In contrast, the methods described herein mandate a specific aging period (e.g., at a temperature in the range of about 20 to about 30° C. for about 5 to 10 days) prior to cell assembly and formation cycling. Aging for shorter or longer periods results in degraded performance relative to the aging process described herein. Consequently, the methods described herein provide unexpectedly improved impedance, coulombic efficiency, and beneficial cathode surface protection not observed with $(Me_3SiO)_3P$ when used conventionally. These improvements are believed to be due to formation of $R_3SiOP(O)_nF_2$ (wherein each R group independently is a hydrocarbyl group (e.g., a $C_1$ to $C_{12}$ hydrocarbyl group such as an alkyl, aryl, aryl-substituted alkyl, alkyl-substituted aryl, and the like); and n is 0 or 1) by degradation of $(Me_3SiO)_3P$ during the aging process. The $R_3SiOP(O)_nF_2$ takes time to build up in the electrolyte solution and then degrades after a certain period of time, which accounts for the need for a controlled aging period. The identity of these fluorinated phosphorus materials as highly active electrolyte additives has not been reported previously.

In another aspect an electrolyte composition for a lithium ion battery comprises a lithium salt (e.g., LiPF$_6$) in a non-aqueous solvent (e.g., an organic carbonate-based solvent). The composition comprises an additive useful for maintaining impedance during electrochemical cycling comprising a compound of formula $R_3SiOP(O)_nF_2$. Each R group independently is a hydrocarbyl group (e.g., a $C_1$ to $C_{12}$ hydrocarbyl group such as an alkyl, aryl, aryl-substituted alkyl, alkyl-substituted aryl, and the like); and n is 0 or 1. The additive is substantially free from $(R_3SiO)_3P(O)_n$ and $(R_3SiO)_2P(O)_nF$ prior to combining the additive with the solvent and lithium salt. Electrochemical cells and batteries comprising the electrolyte also are described. In some embodiments the additive comprises $(CH_3SiO)PF_2$, $(CH_3SiO)P(O)F_2$, or a combination thereof.

Additive compounds of formula $R_3SiOP(O)_nF_2$; wherein each R independently is a hydrocarbyl group; and n is 0 or 1; wherein the additive is substantially free from $(R_3SiO)_3P(O)_n$, can be prepared, for example, by the methods described in Cavell et al., *Inorganic Chemistry;* 1972; 11(11): 2573-2578; Cavell et al., *Inorganic Chemistry;* 1972; 11(11): 2578-2583; and Cavell et al., *Inorganic Chemistry;* 1973; 12(6): 1374-1380; which are incorporated herein by reference.

Example 1. Chemical Aging of TMSPi

Figure 1:
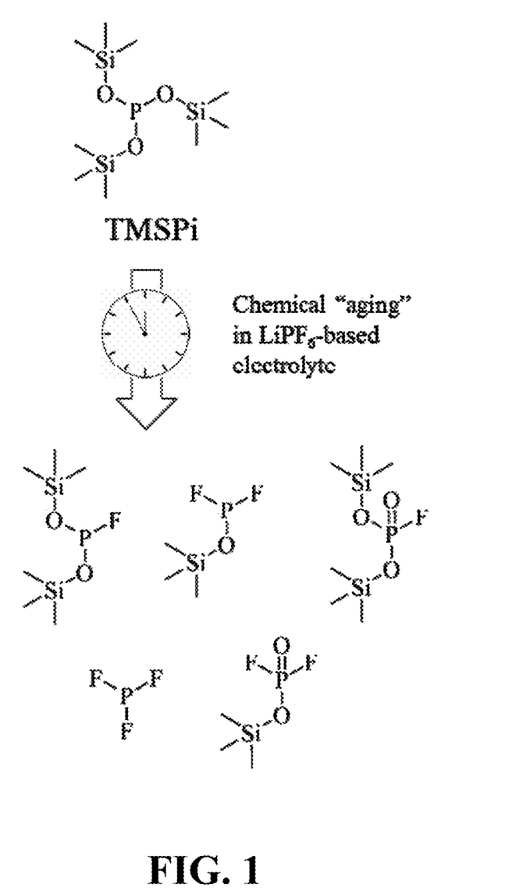
FIG. 1 illustrates aging of a solution containing 1.0 wt % TMSPi in a baseline electrolyte (1.2M $LiPF_6$, EC/EMC 3/7 wt/wt), showing some of the new species created during the "chemical aging" process.

An electrolyte solution containing the baseline electrolyte (1.2 M $LiPF_6$ in EC/EMC, 3/7 wt/wt) and 1.0 wt % TMSPi was prepared in an Argon-atmosphere glove box. Time-dependent nuclear magnetic resonance (NMR) spectroscopy experiments were conducted on the electrolyte solutions over the course of one week. The spectrum of the fresh electrolyte (Day 0) contained peaks from TMSPi and the electrolyte salt $LiPF_6$. At the end of Day 7, no TMSPi was observed, which indicates that the compound had reacted completely. In its place, various new species were observed, some of which are shown in FIG. 1 (indicated by the asterisks). These results indicate dynamic reaction processes during the chemical aging of the electrolyte. It is believed that the trimethylsilyl (TMS) groups of the TMSPi compound react with $LiPF_6$ salt in the electrolyte to generate the new species.

Figure 2:
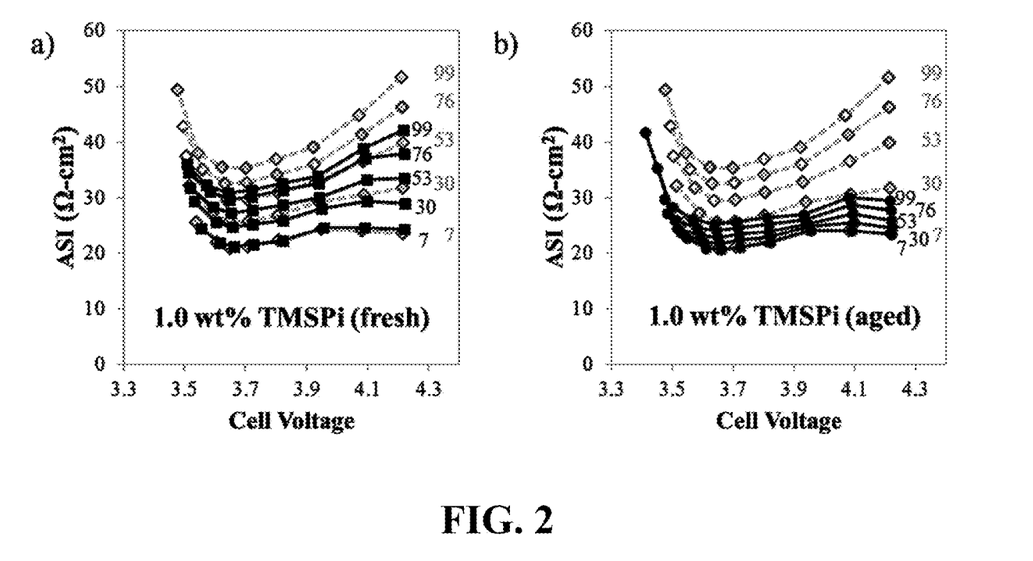
FIG. 2 shows area specific impedance values during cycling of $Li_{1.03}Ni_{0.5}Mn_{0.3}Co_{0.2}O_2$/Graphite full cells containing the baseline electrolyte and either (a) "fresh" or (b) "aged" TMSPi-containing electrolytes. In both plots, the baseline electrolyte data are shown as empty rhombuses connected by dashed gray lines while the fresh and aged electrolyte data are indicated by black markers connected by solid lines. The numbers in the plot indicate the cycle number during which the data was collected.

FIG. 2 shows area specific impedance values during cycling of full cells with $Li_{1.03}Ni_{0.5}Mn_{0.3}Co_{0.2}O_2$ as the cathode active materials and graphite at the anode active material, containing the baseline electrolyte and either (a) "fresh" or (b) "aged" TMSPi-containing electrolytes. In both plots, the baseline electrolyte data are shown as empty rhombuses connected by dashed gray lines while the fresh and aged electrolyte data are indicated by black markers connected by solid lines. The numbers in the plot indicate the cycle number during which the data was collected. FIG. 2, Panel (a) compares data for the baseline and fresh electrolytes and FIG. 2, Panel (b) compares data for the baseline and aged electrolytes: in both plots the baseline electrolyte data is shown as empty rhombuses connected with a dashed gray line. In particular, FIG. 2 shows the average discharge area specific impedance (ASI) vs. cell voltage data, as a function of cell aging, from $Li_{1.03}Ni_{0.5}Mn_{0.3}Co_{0.2}O_2$/Graphite (NMC532/Gr) full cells for three electrolyte solutions: (i) the baseline electrolyte (also referred to as the Gen2, Gen 2, or Gen-2), (ii) the baseline electrolyte with 1.0 wt % TMSPi which was used immediately after being made ("fresh" electrolyte), and (iii) the baseline electrolyte with 1.0 wt % TMSPi, which was aged for one week prior to being used ("aged" electrolyte). All cells (e.g., as described). The cells were prepared as described in Long et al. *J. Electrochem. Soc.,* 2016; 163 (14): A2999-A3009, described above, and were cycled between 3.0-4.4 V at 30° C. using a standard HEHV cycling protocol after formation cycling (id.)

From FIG. 2 it is evident that the aged electrolyte shows a significantly lower full cell impedance rise when compared to both the fresh and the baseline electrolytes. At about 3.7 V (about 50% state of charge) the impedance of the aged electrolyte increases from 21.0 to 25.6 $\Omega$-$cm^2$; in contrast, the impedances of the fresh and baseline electrolyte cells increases from 21.5 to 31.3 $\Omega$-$cm^2$, and from 21.0 to 35.4 $\Omega$-$cm^2$, respectively, over the course of the experiment. It is believed that the new species generated during chemical aging form a protective surface film on the oxide positive electrode leading to a lower cell impedance rise.

Figure 3:
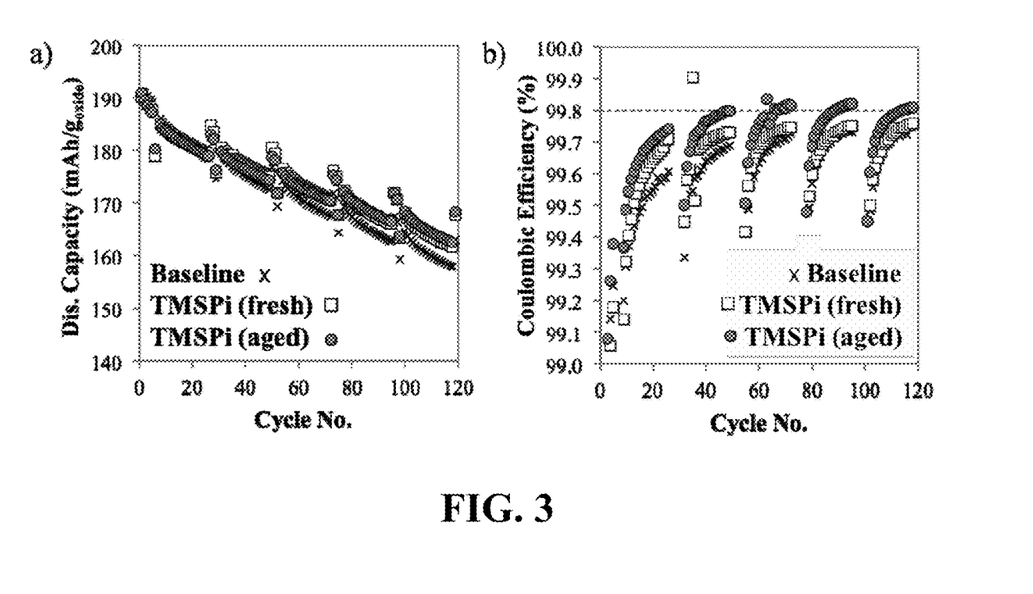
FIG. 3 shows (a) Cell discharge capacity (mAh/$g_{oxide}$) vs. cycle number for $Li_{1.03}Ni_{0.5}Mn_{0.3}Co_{0.2}O_2$/Graphite full cells containing the baseline electrolyte (1.2M $LiPF_6$, EC/EMC 3/7 wt/wt) and "fresh" and "aged" electrolytes containing 1.0 wt % TMSPi additive; and (b) Coulombic efficiencies of the three electrolytes tested. In both plots the baseline electrolyte is shown as crossed lines, the "fresh" 1.0 wt % TMSPi electrolyte as empty squares and the "aged" 1.0 wt % TMSPi electrolyte as full circles.

FIG. 3 shows (a) cell discharge capacity (mAh/g oxide) vs. cycle number for $Li1.03Ni_{0.5}Mn_{0.3}Co_{0.2}O_2$/Graphite full cells containing the baseline electrolyte (1.2 M EC/EMC 3/7 wt/wt) and "fresh" and "aged" electrolytes containing 1.0 wt % TMSPi additive; and (b) Coulombic efficiencies of the three electrolytes tested. In both plots the baseline electrolyte is shown as crossed lines, the "fresh" 1.0 wt % TMSPi electrolyte as empty squares and the "aged" 1.0 wt % TMSPi electrolyte as full circles.

FIG. 3 shows that cell capacity fade (FIG. 3, Panel (a)) is observed for all three electrolytes: however, capacity retention for both the fresh and aged electrolytes is the same (89%), and both are greater than that of the baseline electrolyte (86%). The coulombic efficiencies (FIG. 3, Panel (b)) of the aged electrolyte are better compared than those of the fresh and baseline electrolytes. These results indicate that the aged electrolyte likely forms a better protective film on the positive electrode (oxide) surface.

Example 2. Exemplary Electrochemical Cell and Battery

Figure 4:
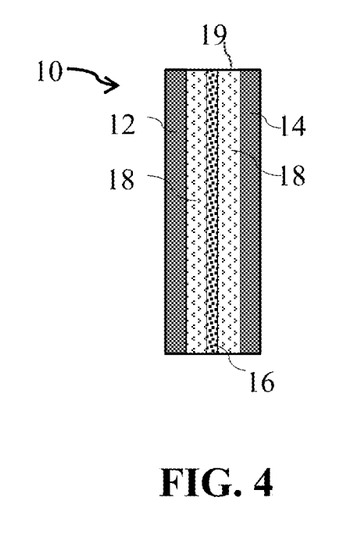
FIG. 4 depicts a schematic representation of an electrochemical cell.
Figure 5:
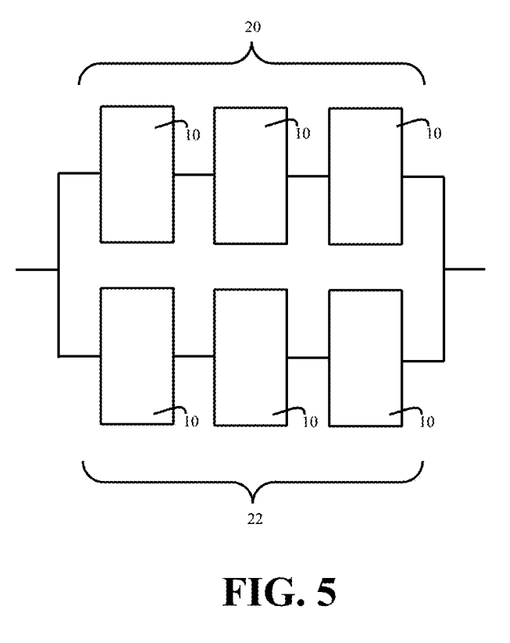
FIG. 5 depicts a schematic representation of a battery consisting of a plurality of cells connected electrically in series and in parallel.

FIG. 4 schematically illustrates a cross-sectional view of lithium-ion electrochemical cell 10 comprising cathode 12, and anode 14, with porous separator membrane 16 therebetween. Electrolyte 18, comprising a solution of a lithium salt in a non-aqueous solvent and the additive, and aged as described herein, contacts electrodes 12 and 14 and separator 16. The electrodes, separator and electrolyte are sealed within housing 19. FIG. 5 schematically illustrates a lithium-ion battery comprising a first cell bank 20 consisting of three series-connected electrochemical cells 10, and a second cell bank 22 consisting of three series-connected electrochemical cells 10, in which first bank 20 is electrically connected to second bank 22 in parallel.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A method for preparing an electrochemical cell; the method comprising the sequential steps of:
    (a) preparing a solution of a lithium salt in a non-aqueous solvent containing an additive compound, and maintaining the solution at a temperature in the range of about 20 to about 30° C. for about 5 to 10 days to form an aged electrolyte; wherein the lithium salt is present in the solution at a concentration in the range of about 0.1 molar (M) to about 3 M and the additive compound is present in the solution at a concentration in the range of about 0.0005 M to about 0.2 M;
    (b) assembling an electrochemical cell by contacting an anode and a cathode with the aged electrolyte;
    (c) electrochemically subjecting the electrochemical cell to formation cycling to form a solid electrolyte interface (SEI) on the anode thereof;
    wherein the additive compound comprises one or more compounds selected from the group consisting of:

$(R_3SiO)_3B$, $(R_3SiO)_3XY$, $(R_3SiO)_3P$, $(R'O)_3PO$, $(R_3Si)_3 X'$, $R_3SiOS(O)_2R'$; $(R_3Si)OC(=O)R$; wherein each R and R' independently is a hydrocarbyl group; X is P or B; Y is O or S; X' is Ti or Al.

2. The method of claim 1, wherein each R and R' independently is a hydrocarbyl moiety selected from the group consisting of alkyl, aryl, aryl-substituted alkyl and alkyl-substituted aryl.

3. The method of claim 1, wherein the additive compound comprises a compound of formula $(R_3SiO)_3P$, wherein each R independently is a hydrocarbyl group.

4. The method of claim 3, wherein each R independently is a hydrocarbyl moiety selected from the group consisting of alkyl, aryl, aryl-substituted alkyl and alkyl-substituted aryl.

5. The method of claim 3, wherein each R independently is a hydrocarbyl moiety selected from the group consisting of methyl, ethyl, n-propyl, isopropyl, n-butyl, sec-butyl, t-butyl, and phenyl.

6. The method of claim 3, wherein each R is methyl.

7. The method of claim 3, wherein step (a) produces a compound of formula $R_3SiOP(O)_nF_2$ from the additive compound; wherein each R independently is a hydrocarbyl group; and n is 0 or 1; wherein the additive is substantially free from $(R_3SiO)_3P(O)_n$ and $(R_3SiO)_2P(O)_nF$.

8. The method of claim 7, wherein each R independently is a hydrocarbyl moiety selected from the group consisting of alkyl, aryl, aryl-substituted alkyl and alkyl-substituted aryl.

9. The method of claim 7, wherein each R independently is a hydrocarbyl moiety selected from the group consisting of methyl, ethyl, n-propyl, isopropyl, n-butyl, sec-butyl, t-butyl, and phenyl.

10. The method of claim 7, wherein each R is methyl.

11. The method of claim 3, wherein the lithium salt comprises at least on salt selected from the group consisting of lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiBOB), lithium difluoro(oxalato)borate (LiDFOB), lithium tetrafluoroborate (LiBF$_4$), lithium hexafluorophosphate (LiPF$_6$), lithium thiocyanate (LiSCN), lithium bis(fluorosulfonyl)imidate (LiFSI), lithium bis(pentafluoroethylsulfonyl)imidate (LBETI), lithium tetracyanoborate (LiB(CN)$_4$), and lithium nitrate.

12. The method claim 3, wherein the lithium salt comprises LiPF$_6$.

13. The method of claim 3, wherein the non-aqueous solvent comprises at least one solvent selected from the group consisting of an ether, a carbonate ester, a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone.

14. The method of claim 3, wherein the non-aqueous solvent comprises a combination of an alkylene carbonate and a dialkyl carbonate.

* * * * *